US012234367B2

(12) United States Patent
Deprez et al.

(10) Patent No.: US 12,234,367 B2
(45) Date of Patent: Feb. 25, 2025

(54) INKJET PRINTING PROCESS, INK SET OF INKJET INKS FOR FORMING AN IMAGE ON A SUBSTRATE

(71) Applicant: XEIKON MANUFACTURING N.V., Lier (BE)

(72) Inventors: Lode Erik Dries Deprez, Lier (BE); Werner Jozef Johan Op De Beeck, Putte (BE); Wouter Jeroom Maria Van Gaens, Duffel (BE); Roel De Mondt, Rumst (BE); Geert Gaston Paul Deroover, Lier (BE); Nils Margaretha Robert De Vos, Puurs-Sint-Amands (BE); Lore Wyns, Booischot (BE)

(73) Assignee: XEIKON MANUFACTURING N.V., Lier (BE)

( * ) Notice: Subject to any disclaimer, the term of this patent is extended or adjusted under 35 U.S.C. 154(b) by 260 days.

(21) Appl. No.: 17/915,881

(22) PCT Filed: Apr. 1, 2021

(86) PCT No.: PCT/EP2021/058744
§ 371 (c)(1),
(2) Date: Sep. 29, 2022

(87) PCT Pub. No.: WO2021/198480
PCT Pub. Date: Oct. 7, 2021

(65) Prior Publication Data
US 2023/0135129 A1   May 4, 2023

(30) Foreign Application Priority Data
Apr. 2, 2020   (NL) .................................. 2025262

(51) Int. Cl.
 *B41M 5/00*     (2006.01)
 *C09D 11/322*   (2014.01)
 *C09D 11/40*    (2014.01)
 *C09D 11/54*    (2014.01)

(52) U.S. Cl.
CPC .......... *C09D 11/322* (2013.01); *B41M 5/0047* (2013.01); *C09D 11/40* (2013.01); *C09D 11/54* (2013.01)

(58) Field of Classification Search
CPC .. B41M 5/0047; C09D 11/106; C09D 11/107; C09D 11/322; C09D 11/326; C09D 11/40; C09D 11/54; C09D 153/00; C08F 293/005
See application file for complete search history.

(56) References Cited

U.S. PATENT DOCUMENTS

| 5,688,311 A * | 11/1997 | Adamic ................ C09D 11/30 106/31.86 |
| 5,713,993 A | 2/1998 | Grezzo Page et al. |
| 2019/0284402 A1 * | 9/2019 | Piotrowski ............... C09D 7/20 |

FOREIGN PATENT DOCUMENTS

| EP | 0952196 A1 | 10/1999 |
| EP | 1239011 A1 | 9/2002 |
| EP | 1285950 A1 | 2/2003 |

OTHER PUBLICATIONS

International Search Report and Written Opinion dated Jul. 16, 2021, for Application No. PCT/EP2021/058744 (14 pages).

* cited by examiner

*Primary Examiner* — Anh T Vo
(74) *Attorney, Agent, or Firm* — KDW Firm PLLC

(57) ABSTRACT

An inkjet printing process and an ink set for forming an image on a substrate by applying a plurality of inkjet inks of the ink set on the substrate. The plurality of inkjet inks include at least a first ink and a second ink, each ink comprising: a pigment and a block copolymer dispersant for dispersing the pigment. The block copolymer dispersant includes a first block and a second block where the second block is formed using at least one monomer $M_2$, which monomer $M_2$ is selected from the group consisting of a methacrylate and an acrylate, and where the monomer $M_2$ is an anchoring monomer for anchoring to the pigment.

18 Claims, No Drawings

INKJET PRINTING PROCESS, INK SET OF INKJET INKS FOR FORMING AN IMAGE ON A SUBSTRATE

This application is a national stage filing under 35 U.S.C. 371 of pending International Application No. PCT/EP2021/058744, filed Apr. 1, 2021, which claims priority to Netherlands Patent Application No. 2025262, filed Apr. 2, 2020, the entirety of which applications are incorporated by reference herein.

FIELD OF INVENTION

The field of the invention relates to an inkjet printing process for forming an image on a substrate by applying a plurality of inkjet inks on the substrate. The field of the invention further relates to an ink set of inkjet inks for forming an image on a substrate according to the present invention.

BACKGROUND

An inkjet printing process for forming an image on a substrate by applying a plurality of inkjet inks on the substrate is generally known. Inkjet inks for industrial printing applications primarily use pigments as colorants, except in the textile industry which often still uses reactive dye based inkjet inks. Pigments are solid materials that also remain as a solid in the inkjet ink carrier, in contrast to dyes which actually dissolve in the carrier medium. The pigment particles are finely dispersed in an ink and are of nanometer scale size. A typical inkjet printing process uses 3 or 4 colors of inkjet inks to create multicolor images. Typical colors are cyan (C), magenta (M), yellow (Y) and black (K). The CMY color inkjet inks are typically made up of organic pigments, wherein some contain a metal atom in a complex, whereas the K inks use organic pigments typically made of carbon black. The pigment powders are commercially not available as nanometer particles, but come as agglomerates and aggregates of pigment particles formed during the synthesis process. The agglomerates and aggregates of pigments need to be made smaller and will typically be brought to the nanometer scale size by grinding, milling, or other techniques to break up the agglomerates and aggregates. The particle size reduction of the pigment powder particles is often carried out in a carrier medium that will be used in a later stage in the ink. Such a process step of making pigment particles smaller is often done at higher pigment concentration than in the final ink and is then referred to as the pigment dispersion.

As discussed above, the pigments are mechanically broken down to sizes of 30-300 nm which are needed to be stabilized by adding dispersing agents (or surfactants) to physically and/or electrostatically prevent the pigments to re-agglomerate. Typically this is a physico-chemical phenomenon as there is no chemical bond between the pigment surface and the dispersing agent. which can be polymeric dispersing agents (e.g. random co-polymer, block-co-polymers, grafted co-polymers) or surfactants.

Sometimes also covalently bound chemicals can be used for pigment particle stabilization in water based inks, but this is mostly a very expensive production process.

A known approach for making stable pigment dispersions is based on random polymerized dispersing agents: they are used in analog inks e g for flexographic printing, but also in inkjet inks. Typically, the random polymers are built up of two kinds of monomers, one which is more pigmentophilic and another which is more compatible with the carrier liquid or matrixophilic so to speak. These monomers are randomly spread out in the polymer, so no polymer structure (i.e. monomer sequence) is pre-defined. Hence a number of polymers will have a favorable structure, capable of stabilizing pigment particles in the liquid, but there is a non-active population as well having a "bad" structure for stabilization (e.g. not enough pigment anchors, not close enough to each other pigment anchors, too few matrixophilic groups). These fractions often are not adsorbed or readily desorbed yielding in a non-stable dispersion.

Block copolymer dispersants containing hydrophobic and hydrophilic blocks have been disclosed in numerous inkjet ink patents. U.S. Pat. No. 5,859,113 (DU PONT) discloses an AB block copolymer dispersant with a polymeric A segment and a polymeric B segment.

A wide variety of polymeric dispersants has been proposed, but the dispersion stability of pigments, especially in inkjet, still needs further improvement. For consistent image quality, the inkjet ink requires a dispersion stability capable of dealing with e.g. high temperatures (above 60° C.) during transport or storage of the ink to a customer and changes in the dispersion medium of the inkjet ink during use such as evaporation of water and increasing concentrations of water soluble organic solvents or the addition of functional polymers to improve the adhesion, drying, water or scratch resistance of the ink on a substrate.

In industrial inkjet processes the demands for stability of pigment dispersions usable for inkjet printing is also increasing, in particular at higher jetting frequencies, smaller droplet formation, higher jetting temperatures and/or more demanding single pass printing applications.

All the ink additives (such as surfactants, latexes, polymers, oligomers, (water soluble) organic solvents) can compete with the dispersing agents to interact with the pigment surface and thus negatively influence the pigment dispersion stability. These additives are typically organic in nature (to certain extent even incompatible with the ink matrix), and they will compete for the same organic surface of the pigments, especially pronounced in water-based inks. If this occurs inside the print head, it will lead to removal of the dispersing agent from the surface, lowering or destroying the stability and give rise to irreversibly blocked nozzles resulting in e.g. white lines and severe reduction of image quality or inks containing too large particles that negatively influence the inkflow into the head.

Due to the increasing demands, there is a need to further optimize the ink additives, such as optimization depending on the type of color pigment, to obtain a consistent image quality and a reliable inkjet process.

As such, there is a need to be able to manufacture such stable pigmented inkjet inks, wherein a dispersion stability of the pigment in the inkjet inks may be enhanced easily for a wider diversity of inkjet inks.

SUMMARY

According to a first aspect of the invention there is provided an inkjet printing process for forming an image on a substrate by applying a plurality of inkjet inks on the substrate, the plurality of inkjet inks comprising at least a first ink and a second ink, each ink comprising:
  a. a pigment;
  b. a block copolymer dispersant for dispersing the pigment;
  c. at least one water soluble organic solvent; and
  d. water;

wherein said pigment P1 of said first ink is different from said pigment P2 of said second ink; and wherein said block copolymer dispersant D1 of said first ink is different from said block copolymer dispersant D2 of said second ink.

According to another aspect of the invention there is provided an ink set of inkjet inks for forming an image on a substrate, the inkjet inks comprising at least a first ink and a second ink, each ink comprising:

a. a pigment;
b. a block copolymer dispersant for dispersing the pigment;
c. at least one water soluble organic solvent; and
d. water;

wherein said pigment P1 of said first ink is different from said pigment P2 of said second ink; and wherein said block copolymer dispersant D1 of said first ink is different from said block copolymer dispersant D2 of said second ink.

It has been found by the inventors that a consistent higher level of pigment dispersion stability in the inkjet inks may be obtained by selecting a block copolymer dispersant D1 of said first ink, which is different from said block copolymer dispersant D2 of said second ink.

Said block copolymer dispersant for dispersing the pigment in the respective ink supports and enhances a reduction of the pigment (aggregate) particle size during preparation of a pigment dispersion. Additionally, the selected block copolymer dispersant for dispersing the respective pigment in the respective ink prevents that the pigments re-agglomerate in the resulting inkjet ink, even when various ink additives, such as water soluble organic solvents, which may compete with the dispersant, are added to the inkjet ink. As a result, a set of inkjet inks for cooperatively forming an image on a substrate may easily be obtained, wherein the inkjet inks may have various compositions in respect of ink additives, such as water soluble organic solvents. Moreover the block copolymer dispersant for dispersing the pigment in the respective ink supports and enhances the jetting stability in industrial inkjet printing having increasing demands for ink durability and consistent image quality.

The at least one water soluble organic solvent may be any water soluble organic solvent, which forms a co-solvent with water. A water soluble organic solvent is defined as being able to form a co-solvent with water (i.e. is mixed) at 20° C. whereby the volume ratio of water soluble organic solvent to water is at least 1:9.

In an exemplary embodiment, the ink is an aqueous ink having an aqueous carrier. The aqueous carrier is liquid at room temperature. The water and water soluble organic solvent, optionally including other co-solvents, form the aqueous carrier for the pigment and block copolymer dispersant.

A pigment dispersion stability as defined in this application may include a pigment particle grinding characteristic of the pigment dispersion and may include a pigment dispersion stability characteristic when exposed to extreme conditions, such as elevated temperature conditions (relative to room temperature or a normal operation temperature of the ink) and critical aqueous carrier conditions, such as by adding and/or increasing the amount of competing water soluble organic solvents to the carrier.

The pigment particle grinding characteristic of the pigment dispersion shows the ability to easily reduce the size of the agglomerates and aggregates of pigments down to nanometer sizes, such as 30-300 nm, which are stabilized by adding the block copolymer dispersant to physically and/or electrostatically prevent the pigments to re-agglomerate.

In exemplary embodiments, the pigment is a color pigment selected for adjusting a color of the ink. In exemplary embodiments, the pigment is an organic pigment, optionally comprising a metal atom complexed with an organic component of the organic pigment.

Block copolymer dispersants, unlike random copolymers, may have an engineered molecular structure in chemical composition (block-wise incorporated in the polymer), narrow molecular weight distribution, and/or defined block chain lengths of the different constituting blocks or monomers. Block copolymer dispersant can be built up of two or more different monomers, arranged in blocks in the polymer.

A block of the block copolymer of the present invention has a narrow molecular weight distribution, and/or defined block chain length. A block copolymer is defined by a polymer consisting of different blocks wherein each block is substantially equal in size and composition meaning that all polymer molecules have substantially the same composition and length. The same composition means that, in case the block contains one type of repeating unit, that the repeating unit is the same, or, in case the block contains two or more different repeating units, that the number ratio between the respective repeating units is the same.

The fact that the individual blocks, and also the complete polymer, is equal in size can be expressed by the polydispersity D, defined as $M_w/M_n$ of the individual block or the complete polymer respectively, which is preferably lower than 1.6, more preferably lower than 1.5.

In an exemplary embodiment, the block copolymer dispersant has a polydispersity D lower than 1.6, more preferably lower than 1.5. In a particular embodiment, each of the blocks of the block copolymer dispersant has a polydispersity D lower than 1.6, more preferably lower than 1.5.

Compared to random copolymers that are used commonly as a pigment dispersing agent, the pigmentophilic monomers in block copolymer dispersants can be built as a block of appropriate size and chemistry next to one or more matrixophilic monomer-based blocks of appropriate size and chemistry. This creates an opportunity to fine-tune and thus maximize the interaction between a certain pigment and a block copolymer based dispersing agent. A maximized interaction will yield a strong physico chemical connection of the dispersing agent with the pigment surface. Since dispersing agents are put on the surface of pigments to prevent re-agglomeration of the pigments, this strong fixation of the dispersing agent to the pigment surface will enable the creation of highly stable pigment dispersions, especially when used in the final ink. A strong link of dispersing agent with the pigment will withstand also the competing interactions of other ink additives that in water based inks tend to be (at least partly) hydrophobic in nature and thus want to get to the organic pigment surface as well.

It has been found that selecting block copolymer dispersants with different properties allows dedicated chemical fine-tuning of the dispersing agent, which creates the possibility to optimize the physical interaction of the polymeric dispersing agent to the organic pigment surface. Overall, the balancing act in the design of the copolymer dispersant lies in the pigmentophilic/matrixophilic balance. For water based inks important seems the relative hydrophilic/hydrophobic nature of the polymer. In this way the organic pigment particle can be compatibilized with the carrier.

The first block copolymer dispersant D1 may be different from said second block copolymer dispersant D2 based on at least one of the chemical nature of the blocks of the block copolymer dispersant, on the molecular weight distribution, on the polydispersity, on the number of different blocks, on the length of the different blocks in the polymer chain, on the relative presence of the different blocks in the polymer chain, but are not limited hereto.

In an exemplary embodiment, the inkjet process comprises jetting droplets of each inkjet ink on the substrate to form a color image on the substrate. In a particular exemplary embodiment, the droplets are jetted by using a inkjet print head.

In an exemplary embodiment, the inkjet process comprises forming the image on a finished corrugated board, a corrugated liner, label substrate or flexible packaging substrate. In an exemplary embodiment, the inkjet process is used for improving adhesion of the pigment to the substrate. In particular, the ink may contain at least one functional polymer to improve at least one of adhesion to a substrate, drying, water or scratch resistance of the ink on a substrate.

In an exemplary embodiment, for each of the block copolymer dispersants D1, D2 the block copolymer dispersant comprises a first block, wherein a number of repeating units of the first block is defined as n, and a second block, wherein a number of repeating units of the second block is defined as m, wherein preferably the first block is a hydrophilic stabilization part for aqueous phase stabilization of the pigment and the second block is an anchoring part for anchoring to the pigment. A hydrophilic stabilization part is defined as a part of the block copolymer which has higher affinity towards water (or towards the aqueous carrier) relative to the water affinity of the anchoring part of the block copolymer.

In a particular embodiment, for at least one of, preferably each of, the block copolymer dispersants D1, D2 each of the first block and the second block of the block copolymer dispersant has a polydispersity D lower than 1.6, more preferably lower than 1.5.

The polydispersity of a block may be determined before adding another block to said block during the synthesis of the block copolymer dispersant.

A block of the block copolymer dispersant may additionally contain an initiator moiety, a terminating moiety, an end group, and/or a linking moiety.

A repeating unit of a block may comprise a substituent. The substituent may optionally be converted to another substituent, thereby modifying the repeating unit, after polymerizing the block or after polymerizing the block copolymer.

According to the invention, a first block and a second block of a block copolymer dispersant may be arranged in any order along the block copolymer dispersant. Thus, the term 'first block' and the term 'second block' do not specify a relative position of the block along the block copolymer dispersant.

Additionally, the block copolymer dispersant may further comprise another block formed from another monomer. Thus, the block copolymer dispersant may be a diblock copolymer having two blocks, may be a triblock copolymer having three blocks and may have any other suitable number of blocks larger than three.

Moreover, the term 'first block' and the term 'second block' do not specify or limit an order of forming the blocks when synthesising the block copolymer.

In a particular exemplary embodiment, for at least one of, preferably each of, the block copolymer dispersants D1, D2 the first block is formed using at least one monomer $M_1$, preferably a hydrophilic monomer for aqueous phase stabilization of the pigment, which is selected from the group consisting of methacrylic acid, acrylic acid, maleic acid, maleic acid monoester, itaconic acid, itaconic acid monoester, crotonic acid, crotonic acid monoester, N,N-dimethylaminoethyl methacrylate, N,N-diethylaminoethyl methacrylate, N,N-dimethylaminoethyl acrylate, N.Ndiethylaminoethyl acrylate, t-butylaminoethyl methacrylate, t-butylaminoethyl acrylate and mixtures thereof. The term hydrophilic monomer is defined as a monomer having a higher affinity towards water (or towards the aqueous carrier) relative to the water affinity of an anchoring monomer for anchoring to the pigment.

The acid containing repeating unit may be made directly or may be made from a blocked monomer with the blocking group being removed after polymerization. Examples of blocked monomers that generate acrylic or methacrylic acid after removal of the blocking group include: trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, and 2-tetrahydropyranyl methacrylate.

A repeating unit of the first block is formed using a monomer $M_1$. In case two different monomers $M_1$ are used to form the first block, the first block has a first repeating unit and a second repeating unit, each formed by a respective, different, monomer $M_1$. The number of first repeating units and the number of second repeating units of the first block together sum up to the total number n of repeating units of the first block.

In a particular exemplary embodiment, for at least one of, preferably each of, the block copolymer dispersants D1, D2 the second block is formed using at least one monomer $M_2$, preferably an anchoring monomer for anchoring to the pigment, which is selected from the group consisting of a methacrylate, an acrylate, and vinyl monomers.

In a particular exemplary embodiment, for each of the block copolymer dispersants D1, D2 the second block is an anchoring part for anchoring to the pigment, and wherein the second block of the block copolymer dispersant D1 of the first ink is different from the second block of the block copolymer dispersant D2 of the second ink in at least one of:

$m_1$, which is the number of repeating units of the second block of the block copolymer dispersant D1, is different from $m_2$, the number of repeating units of the second block of the block copolymer dispersant 2;

at least one repeating unit of the second block of the block copolymer dispersant D1 is different from the repeating units of the second block of the block copolymer dispersant D2; and wherein the second block has at least two, differing, repeating units, and wherein a number ratio between respective repeating units of the block copolymer dispersant D1 is different from a number ratio between respective repeating units of the block copolymer dispersant D2.

In a particular example, the at least two, differing, repeating units of the second block may be formed by using at least two differing anchoring monomers $M_2$.

Preferably, in case the second block has at least two, differing, repeating units, at least one repeating unit has a substituent selected from ethylene glycol methyl ether, 2-ethoxyethyl, di(ethylene glycol) methyl ether, tri(ethylene glycol) methyl ether, 2-(2ethoxyethoxy)ethyl, hydroxyethyl, and hydroxypropyl, and another repeating unit has an aryl substituent and/or alkyl substituent. In particular examples, the other repeating unit has an aryl substituent, wherein the repeating unit is selected from benzyl methacrylate, phenoxyethyl methacrylate, p-tolyl methacrylate, benzyl acrylate, phenoxyethyl acrylate, and p-tolyl acrylate. In preferred examples, the at least two, differing, repeating units are substantially randomly distributed within the second block. It has been found that the glycol and hydroxyl containing repeating units provide an improved water solubility of the dispersant and supports a wider usability of the dispersant in ink jet ink compositions, while maintaining a suitable anchoring to the respective pigment.

In a particular exemplary embodiment, for each of the block copolymer dispersants D1, D2 the first block is a hydrophilic stabilization part for aqueous phase stabilization of the pigment, and wherein the first block of the block copolymer dispersant D1 of the first ink is different from the first block of the block copolymer dispersant D2 of the second ink in at least one of:

$n_1$, which is the number of repeating units of the first block of the block copolymer dispersant D1, is different from $n_2$, the number of repeating units of the first block of the block copolymer dispersant D2;

at least one repeating unit of the first block of the block copolymer dispersant D1 is different from the repeating units of the first block of the block copolymer dispersant D2; and wherein the first block has at least two, differing, repeating units, and wherein a number ratio between respective repeating units of the block copolymer dispersant D1 is different from a number ratio between respective repeating units of the block copolymer dispersant D2.

In exemplary embodiments, in case a repeating unit, such as an acidic repeating unit having an acidic group, can be modified by a neutralizing agent to make the repeating unit compatible with the carrier. The choice of the neutralizing agent and thus the corresponding used salt counterion of the repeating unit determines the, modified, repeating unit in such way that this has to be considered as a different chemical structure. Thus, a repeating unit may differ from another repeating unit due to the selection of the neutralizing agent and corresponding salt counterion. It has been found that the selection of the neutralizing agent and corresponding salt counterion of the repeating unit may have an effect on pigment dispersion stability; including an effect on a pigment particle grinding characteristic and speed of the pigment dispersion and/or including an effect on a pigment dispersion stability characteristic when exposed to extreme conditions. The selection of the neutralizing agent, pH value and corresponding salt counterion can also influence the behaviour of the final ink, e.g. the drying speed, open time, first drop reliability and the jetting stability.

In a particular example, in case the first block has at least two, differing, repeating units, the at least two, differing, repeating units of the first block may be formed by using at least two differing monomers $M_1$.

In a particular exemplary embodiment, for at least one of, preferably each of, the block copolymer dispersants D1, D2 the anchoring monomer $M_2$ is at least one of benzyl methacrylate, butyl methacrylate, methyl methacrylate, ethyl methacrylate, propyl methacrylate, hexyl methacrylate, 2-ethylhexyl methacrylate, octyl methacrylate, lauryl methacrylate, stearyl methacrylate, phenoxyethyl methacrylate, methacrylonitrile, glycidyl methacrylate, p-tolyl methacrylate, sorbyl methacrylate, ethylene glycol methyl ether methacrylate, 2-ethoxyethyl methacrylate, di(ethylene glycol) methyl ether methacrylate, tri(ethylene glycol) methyl ether methacrylate, hydroxyethyl methacrylate, hydroxypropyl methacrylate, benzyl acrylate, butyl acrylate, methyl acrylate, ethyl acrylate, propyl acrylate, hexyl acrylate, 2-ethylhexyl acrylate, octyl acrylate, lauryl acrylate, stearyl acrylate, phenoxyethyl acrylate, glycidyl acrylate, p-tolyl acrylate, sorbyl acrylate, ethylene glycol methyl ether acrylate, 2-ethoxyethyl acrylate, di(ethylene glycol) methyl ether acrylate, tri(ethylene glycol) methyl ether acrylate, hydroxyethyl acrylate, hydroxypropyl acrylate, dimethylaminoethyl acrylate (DMAA), N,N-dimethylacrylamide, acryloyl morpholine (ACMO), N-vinylpyrrolidone (NVP), vinyl methyl oxazolidinone (VMOX), and mixtures thereof.

It can be beneficial for pigments which have a more polar surface, like a pigment red PR57.1, that the anchoring part additionally comprises at least one hydrophilic monomer to be used as anchoring monomer $M_2$ in addition to at least one anchoring monomer $M_2$ mentioned above in the non-extensive list of monomers $M_2$. The at least one hydrophilic monomer may be any one of dimethylaminoethyl acrylate (DMAA), N,N-dimethylacrylamide, acryloyl morpholine (ACMO), N-vinylpyrrolidone (NVP), and vinyl methyl oxazolidinone (VMOX) and 2-(2ethoxyethoxy)ethyl acrylate (EOEOEA).

In a particular example, when using Pigment Red 57:1, the hydrophilic anchoring monomer $M_2$ is at least one of dimethylaminoethyl acrylate (DMAA), N,N-dimethylacrylamide, acryloyl morpholine (ACMO), N-vinylpyrrolidone (NVP), vinyl methyl oxazolidinone (VMOX), and mixtures thereof.

In a particular exemplary embodiment, the second block of the first block copolymer dispersant D1 comprises a repeating unit formed using an aryl (meth)acrylate monomer, and the second block of the second block copolymer dispersant D2 comprises a repeating unit formed using an alkyl (meth)acrylate monomer.

The term (meth)acrylate is defined as at least one compound selected from the group consisting of acrylate and methacrylate. The term aryl (meth)acrylate monomer is defined as having an aryl group. The term an alkyl (meth)acrylate monomer is defined as having an alkyl group having a linear, branched or alicyclic structure and having a number of carbon atoms in the range of 2 to 25, preferably in the range of 4 to 20. Preferably, the alkyl (meth)acrylate monomer does not contain an aryl group. Optionally, the alkyl group is substituted, such as substituted by one or more alkoxy groups.

In another example, the alkyl group is a terminal group, which is connected to the (meth)acrylate group, which is used to form the polymer backbone, via a linking segment. In examples, said linking segment comprises one or more glycol groups. An exemplary alkyl (meth)acrylate monomer having an alkyl terminal group $R_1$ and a linking segment is defined as:

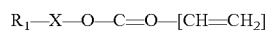

$$R_1-X-O-C=O-[CH=CH_2]$$

wherein $R_1$ is the alkyl terminal group, X is the linking segment, wherein the linking segment is selected from a mono glycol, such as ethylene glycol, and a polyglycol group, such as di(ethylene glycol) and tri(ethylene glycol).

Examples of the alkyl (meth)acrylates include (meth)acrylates containing a linear alkyl group are methyl (meth)acrylate, ethyl (meth)acrylate, propyl (meth)acrylate, butyl (meth)acrylate, pentyl (meth)acrylate, octyl (meth)acrylate, decyl (meth)acrylate, dodecyl (meth)acrylate and stearyl (meth)acrylate; examples of alkyl (meth)acrylates containing a branched alkyl group are isopropyl (meth)acrylate, isobutyl (meth)acrylate,tert-butyl (meth)acrylate, isopentyl (meth)acrylate, isooctyl (meth)acrylate, isodecyl (meth)acrylate, isododecyl (meth)acrylate, isostearyl (meth)acrylate and 2-ethylhexyl (meth)acrylate; and an example of a alkyl (meth)acrylates containing an alicyclic alkyl group is cyclohexyl (meth)acrylate.

Examples of the alkyl (meth)acrylates include (meth) acrylates containing an alkyl terminal group and one ore more glycol groups are ethylene glycol methyl ether methacrylate, 2-ethoxyethyl methacrylate, di(ethylene glycol) methyl ether methacrylate, tri(ethylene glycol) methyl ether methacrylate, ethylene glycol methyl ether acrylate, 2-ethoxyethyl acrylate, di(ethylene glycol) methyl ether acrylate, and tri(ethylene glycol) methyl ether acrylate.

In a particular exemplary embodiment, the aryl (meth) acrylate monomer contains a benzyl moiety and/or wherein the alkyl (meth)acrylate monomer contains a branched alkyl moiety, preferably being ethylhexyl (meth)acrylate monomer.

In a particular exemplary embodiment, preferably wherein the second block comprises a repeating unit formed using the aryl (meth)acrylate monomer, the first block copolymer dispersant D1 has a ratio n/m (between the number of repeating units n of the first block and the number of repeating units m of the second block), which is <3.0, preferably <2.0, and in particular >0.2.

In a particular exemplary embodiment, preferably wherein the second block comprises a repeating unit formed using the alkyl (meth)acrylate monomer, the second block copolymer dispersant D2 has a number of repeating units m in the range 10-100, preferably wherein a ratio n/m (between the number of repeating units n of the first block and the number of repeating units m of the second block) is <3.0, and in particular >0.2, wherein more preferably the number of repeating units n is in the range 5-50.

In a particular exemplary embodiment, the first block comprises a repeating unit formed using a monomer, which is selected from methacrylic acid and acrylic acid.

In an exemplary embodiment, for at least one of, preferably each of, the block copolymer dispersants D1, D2 the block copolymer dispersant is a diblock copolymer.

In a particular embodiment, an ink comprises a further block copolymer dispersant D3, D4 for dispersing the same respective pigment P1, P2, additional to the first or second block copolymer dispersant, respectively, for dispersing the respective pigment P1, P2. Thus, the pigment P1 is dispersed by block copolymer dispersant D1 and block copolymer dispersant D3 and the pigment P2 is dispersed by block copolymer dispersant D2 and block copolymer dispersant D4. The further block copolymer dispersant D3, D4 may, for example, provide wetting of the pigment for enhancing a grinding process, while the first or second block copolymer dispersant for dispersing the respective pigment P1, P2 may for example, provide stability of the dispersed pigment in the pigment dispersion and in the ink jet ink.

In an exemplary embodiment, the inkjet inks of the ink set comprise a cyan ink comprising a cyan pigment, a magenta ink comprising a magenta pigment, a yellow ink comprising a yellow pigment and a black ink comprising a black pigment. In this embodiment, the first ink of the ink set is one of the cyan ink, magenta ink, yellow ink and black ink and the second ink of the ink set is another one of the cyan ink, magenta ink, yellow ink and black ink.

In a particular embodiment, the first ink of the ink set is one of the cyan ink, magenta ink, yellow ink and the second ink of the ink set is a black ink. Herein the second pigment P2 is a black pigment and the first pigment P1 of the first ink is one of a cyan pigment, magenta pigment and yellow pigment, respectively.

In an exemplary embodiment, the second pigment P2 is a black pigment and the second block copolymer dispersant D2 has a second block, comprising a repeating unit formed using an alkyl (meth)acrylate monomer. In a further exemplary embodiment, the first block copolymer dispersant D1 has a second block, comprising a repeating unit formed using an aryl (meth)acrylate monomer, wherein the first block copolymer dispersant D1 is used to disperse the cyan pigment and is used to disperse the yellow pigment, optionally including is used to disperse the magenta pigment.

In an exemplary embodiment, the first block copolymer dispersant D1 has a second block, comprising a repeating unit formed using an aryl (meth)acrylate monomer, wherein the first block copolymer dispersant D1 is used to disperse the cyan pigment and is used to disperse the yellow pigment, the second block copolymer dispersant D2 has a second block, comprising a repeating unit formed using an alkyl (meth)acrylate monomer, wherein the second block copolymer dispersant D2 is used to disperse the black pigment and a third block copolymer dispersant D3 having a second block, comprising a repeating unit formed from an alkyl (meth)acrylate monomer, wherein the third block copolymer dispersant D3 is different from the second block copolymer dispersant D2, wherein the third block copolymer dispersant D3 is used to disperse the magenta pigment.

In a particular exemplary embodiment, the magenta pigment is a quinacridone pigment selected from Pigment Red 122, Pigment Violet 19 and Pigment Red 202, or the magenta pigment is Pigment Red 57:1, and/or wherein the cyan pigment is Pigment Blue 15:3, and/or wherein the yellow pigment is selected from Pigment Yellow 155 and Pigment Yellow 74, and/or wherein the black pigment is a carbon black, preferably Pigment Black 7.

In an exemplary embodiment, the amount of pigment of each ink is at least 1.0 weight-%, preferably at least 2.0 weight-%, relative to the total weight of the ink, wherein preferably each ink has a viscosity of at most 20 mPa·s at 25° C.

In an exemplary embodiment, the block copolymer dispersant is at least partially crosslinked, wherein the block copolymer dispersant is attached to or at least partially encapsulates the pigment.

In an exemplary embodiment, the water soluble organic solvent comprises at least one of a polyol compound and a (poly)glycol ether or (poly)propyleneglycol ether compound. A polyol compound in the context of this application is the same as a polyhydric alcohol, i.e. having at least two alcohol groups. In a particular exemplary embodiment, the water soluble glycol ether compound is a glycol monobutyl ether.

A water soluble organic solvent may be selected being a penetrant for improving permeability (wettability) of the ink into the substrate. A penetrant supports adjusting a dot diameter on the substrate and/or improves adhesion of the pigment to the substrate. Particular suitable penetrants have surface tension active properties thereby lowering the surface tension of the ink.

Exemplary penetrants include alkanediols and glycol/propyleneglycol ethers. It has been found by the inventors that water soluble organic solvents having penetrant properties tend to compete s with dispersants, which stabilize the pigment.

An exemplary penetrant is a glycol monobutyl ether, such as diethylene glycol monobutyl ether or ethylene glycol monobutyl ether. It should be noted that some penetrants like diethylene glycol monobutyl ether, ethylene glycol monobutyl ether, dipropyleneglycol monomethylether, ethylene glycol isopropylether, 1,2-hexanediol have surface tension active properties thereby lowering the surface tension of the ink.

In an exemplary embodiment, the weight-concentration of the at least one water soluble organic solvent, in the ink is in the range of 5 wt-%-40 wt-%, preferably in the range of 7.5 wt-%-35 wt-%, based on the total weight of the ink.

In a particular embodiment, the weight-concentration of the at least one penetrant in the ink is in the range of 1 wt-%-15 wt-%, preferably in the range of 2 wt-%-10 wt-%, based on the total weight of the ink.

In exemplary embodiments, the viscosity of the inkjet inks is between 4 and 30 mPa·s at 25° C., preferably between 4 and 20 mPa·s at 25° C.

In exemplary embodiments, the static surface tension of the inkjet inks is between 17 and 35 mN/m.

DETAILED DESCRIPTION

As used herein, the term "dispersion" means a two-phase system wherein one phase consists of finely divided particles (often in a colloidal size range) distributed throughout a bulk substance, the particles being the dispersed or internal phase and the bulk substance being the continuous or external phase.

As used herein, the term "dispersant" means a surface active agent added to a suspending medium to promote uniform and maximum separation of extremely fine solid particles. For pigments, the dispersants can be polymeric dispersants, and the dispersion comprising the dispersants and pigments is usually prepared using dispersing equipment.

As used herein, the term "aqueous" refers to water or a mixture of water and at least one water soluble, or partially water soluble, organic solvent (co-solvent). As used herein, the term "water based ink" has the same meaning as the term "aqueous ink".

As used herein, the term "substantially" means being of considerable degree, almost all.

As used herein, the term "ink set" means a combination of ink jet inks used as a kit of parts for printing an image on a substrate by applying the inkjet inks on the substrate according to the present invention. In particular, the ink set is a combination of inkjet inks which may be used together in the same printing process to form a color image on the substrate.

The materials, methods, and examples herein are illustrative, and are not intended to be limiting.

Aqueous Inks

Aqueous inks can be broadly classified into pigment inks and dye inks. In recent years, demand has been growing for pigmentinks, which exhibit excellent color development and solvent, gas and (UV-)light resistance and the like. On the other hand, in the case of pigment aqueous dispersion inks, because the pigment is insoluble in water, in many cases, satisfactory pigment dispersibility cannot be achieved. Accordingly, in order to maintain favorable pigment dispersibility within aqueous inks, pigment dispersing resins have been used to achieve better dispersion stability of the pigment in water. These pigments are also considered better performing towards migration into food compared to dyes.

The use of a colorant in inks as described above is the most essential form of a water-based ink. However in order to prevent drying of the ink at the nozzles, aqueous inks used in inkjet printing methods typically also contain a water soluble organic solvent having a high boiling point and favorable solubility in water. This type of solvent may also be regarded as a humectant in the aqueous ink.

Aqueous inks used in inkjet printing methods may typically also contain a water soluble organic solvent being a penetrant for improving permeability (wettability) of the ink into the substrate. A penetrant supports adjusting a dot diameter on the substrate and/or improves adhesion of the pigment to the substrate. Particular suitable penetrants have surface tension active properties thereby lowering the surface tension of the ink. Further, to enable a minimal amount of wetting and spreading of water based inks in the printhead, on the substrate, etc. the aqueous inks used in inkjet printing methods typically also contain one or more surfactants.

Finally, the aqueous ink composition may also contain various types of additives such as anti-foaming agents, thickeners, binders and preservatives as required. Adding these types of additives to the aqueous ink composition enables the composition to be used more favorably as an inkjet ink.

Pigment

A pigment is preferably used from the viewpoints of offering excellent water resistance, light resistance, weather resistance and gas resistance or the like. Examples of pigments that may be used in the present invention include conventional organic pigments and inorganic pigments. The pigment may be chosen from those disclosed by HERBST, W, et al. Industrial Organic Pigments, Production, Properties, Applications. 2nd edition. vch, 1997.

The pigment particles in the pigmented inkjet ink should be sufficiently small to permit free flow of the ink through the inkjet printing device, especially at the ejecting nozzles. It is also desirable to use small particles for maximum color strength and to slow down sedimentation.

The average particle size of the pigment in the pigmented inkjet ink should be between 5 nm and 1 µm, particularly preferably between 5 nm and 500 nm and most preferably between 30 nm and 300 nm. Larger pigment particle sizes may be used as long as the objectives of the present invention are achieved.

The pigment is used in the pigmented ink jet ink in an amount of 0.1 to 20 wt-%, preferably 1 to 10 wt-% based on the total weight of the pigmented inkjet ink.

Examples of cyan pigments that can be used in the present invention include C.I. Pigment Blue 1, 2, 3, 15:3, 15:4, 15:6, 16 and 22, and C.I. Vat Blue 4 and 6. These cyan pigments may be used individually, or a combination of two or more pigments may be used.

Examples of magenta pigments that can be used in the present invention include C.I. Pigment Red 5, 7, 12, 22, 23, 31, 48 (Ca), 48 (Mn), 49, 52, 53, 57 (Ca), 57:1, 112 and 122; Quinacridone solid solutions 146, 147, 150, 185, 238, 242, 254, 255, 266 and 269, and C.I. Pigment Violet 19, 23, 29, 30, 37, 40, 43 and 50.

Examples of yellow pigments that can be used in the present invention include C.I. Pigment Yellow 10, 11, 12, 13, 14, 17, 20, 24, 74, 83, 86, 93, 94, 95, 109, 110, 117, 120, 125, 128, 137, 138, 139, 147, 148, 150, 151, 154, 166, 168, 180, 185 and 213.

Examples of black pigments that can be used in the present invention include organic pigments such as aniline black, Lumogen black and azomethine black, and inorganic pigments such as carbon black and iron oxide. Further, a plurality of color pigments such as the aforementioned yellow pigments, magenta pigments and cyan pigments may be mixed together and used as a black pigment.

There are no particular limitations on the inorganic pigments that may be used in the present invention. Examples of inorganic pigments other than the carbon black and iron oxide mentioned above include titanium oxide.

Examples of carbon black pigments that can be used in the present invention include carbon blacks produced using the furnace method or the channel method.

Examples of commercial products are listed below, and any of these products can be used favorably.

Specific examples of carbon black include No. 33, 40, 45, 52, 900, 2200B, 2300, MA7, MA8 and MCF88 (all manufactured by Mitsubishi Chemical Corporation), RAVEN 1255 (manufactured by Columbian Chemicals Co., Inc.), REGAL 330R, 400R and 660R, and MOGUL L (all manufactured by Cabot Corporation), and Nipex 1601Q, Nipex 1701Q, Nipex 75, Printex 85, Printex 95, Printex 90, Printex 35 and Printex U (all manufactured by Orion Engineered Carbons LLC).

In this embodiment of the present invention, the pigment is not limited to the pigments described above, and other special colors such as orange pigments and green pigments can also be used. Further, a plurality of pigments may be combined. Moreover, in another embodiment, the aqueous ink composition of this embodiment of the present invention may be combined with a clear ink containing no pigment and used as an ink set.

Any other pigment and/or dye can be used that is useful in modifying the color of the ink. Additionally, the colorant can include a white pigment such as titanium dioxide, or other inorganic pigments such as zinc oxide and iron oxide.

Surfactant

The inkjet ink according to the present invention may contain at least one surfactant. The surfactant(s) can be anionic, cationic, non-ionic, or zwitter-ionic and are usually added in a total quantity less than 6 wt-% based on the total weight of the pigmented inkjet ink and particularly in a total less than 4 wt-% based on the total weight of the pigmented inkjet ink.

Suitable surfactants for the inkjet ink according to the present invention include silicon-based, acrylic-based and fluorine-based surfactants, fatty acid salts, ester salts of a higher alcohol, alkylbenzene sulphonate salts, sulphosuccinate ester salts and phosphate ester salts of a higher alcohol, ethylene oxide adducts of a higher alcohol, ethylene oxide adducts of an alkylphenol, ethylene oxide adducts of a polyhydric alcohol fatty acid ester, and acetylene glycol and ethylene oxide adducts thereof. Commercial examples include Byk-348, Byk-347, Byk 3450, Dynwet 800 (Byk Chemie Gmbh); Surfynol 104, Surfynol 465, Metolat 364, Dynol 800, Dynol 960, (Evonik Industries), KF-640, KF-642 (Shin-Etsu); ID-40, ID-70 (Sanyo Chemical industries); etc and combinations thereof.

Water Soluble Organic Solvent

The type of water soluble, organic, solvent is not particularly limited insofar as the effects of the present invention can be obtained. It is preferable that the organic solvent is water soluble from the viewpoint of increasing the compatibility with respect to water. Examples of the water soluble organic solvent include alcohols, polyhydric alcohols, amines, amides, glycol ethers, 1,2-alkanediols and the like. Only one type of the organic solvent may be used, or two or more types thereof may be used.

Examples of polyhydric alcohols described above include ethylene glycol, diethylene glycol, triethylene glycol, tetraethylene glycol, polyethylene glycol having the number of ethylene oxide groups of greater than or equal to 5, propylene glycol, dipropylene glycol, tripropylene glycol, polypropylene glycol having the number of propylene oxide groups of greater than or equal to 4, butylene glycol, hexanediol, pentanediol, glycerin, hexanetriol, thiodiglycol, and the like. Examples of amines described above include ethanol amine, diethanol amine, triethanol amine, N-methyl diethanol amine, N-ethyl diethanol amine, morpholine, N-ethyl morpholine, ethylene diamine, diethylene diamine, triethylene tetramine, tetraethylene pentamine, polyethylene imine, pentamethyl diethylene triamine, tetramethyl propylene diamine, and the like.

Examples of amides described above include formamide, N,N-dimethyl formamide, N,N-dimethyl acetamide, pyrolidone, urea and the like.

Examples of glycol ethers described above include ethylene glycol monoethyl ether, ethylene glycol monobutyl ether, diethylene glycol monoethyl ether, diethylene glycol monobutyl ether, triethylene glycol monobutyl ether, propylene glycol monopropyl ether, dipropylene glycol monomethyl ether, tripropylene glycol monomethyl ether, and the like.

Examples of 1,2-alkanediols include 1,2-propanediol 1,2-butanediol, 1,2-pentanediol, 1,2-hexanediol, 1,2-heptanediol, and the like.

Among them, in a case where the water soluble organic solvent is polyhydric alcohols, blur at the time of performing printing at a high velocity can be preferably suppressed. Preferred examples of polyhydric alcohols include ethylene glycol, diethylene glycol, triethylene glycol, tetraethylene glycol, propylene glycol, dipropylene glycol, tripropylene glycol, and the like.

Water soluble organic solvents may be selected being a penetrant for improving permeability (wettability) of the ink into the substrate. A penetrant supports adjusting a dot diameter on the substrate and/or improves adhesion of the pigment to the substrate. Particular suitable penetrants include alkanediols and glycol ethers.

An exemplary penetrant is a glycol monobutyl ether, such as diethylene glycol monobutyl ether and ethylene glycol monobutyl ether. It should be noted that some penetrants like diethylene glycol monobutyl ether, ethylene glycol monobutyl ether, ethylene glycol isopropylether, 1,2-hexanediol also have surface tension active properties thereby lowering the surface tension of the ink.

The content of the at least water soluble organic solvent in the printing ink, for example, can be in a range of greater than or equal to 5 wt-% and less than or equal to 50 wt-%.

Binder Resin

In one embodiment, the aqueous ink composition of the present invention preferably also contains a binder resin (functional polymer). Known binder resins for aqueous ink compositions include water soluble resins and resin microparticles (emulsions/latexes). Examples of types of resins that can be used as the resin microparticles include acrylic-based, styrene/acrylic-based, urethane-based, styrene/butadiene-based, vinyl chloride-based, vinylacetate-based (possibly partially or fully hydrolysed), polyester-based, and polyolefin-based resins.

Biocides

Suitable biocides for the pigmented inkjet ink of the present invention include sodium dehydroacetate, 2-phenoxyethanol, sodium benzoate, sodium pyridinethion-1-oxide, ethyl p-hydroxybenzoate, 2-methyl-1,2-thiazol-3-one and 1,2-benzisothiazolin-3-one and salts thereof.

A biocide is preferably added in an amount of 0.001 to 3 wt-%, more preferably 0.01 to 1.00 wt-%, each based on the total weight of the pigmented inkjet ink.

Other Components

In the ink jet printing ink, various known additives, for example, polysaccharides, a viscosity adjuster, a film forming agent, a pH adjuster and the like can be suitably selected and used in addition to the components described above, as necessary, according to the object of improving all performances.

Preparation of a Pigmented Inkjet Ink

The pigmented inkjet ink according to the present invention may be prepared by first preparing the pigment dispersion and afterwards dilute the pigment dispersion to the desired pigment concentration and adding all the other ink components. The pigment dispersion is prepared by milling the pigment in the dispersion medium in the presence of the dispersant.

In a first step of the pigment dispersion preparation the ingredients are mixed together to form a predispersion. Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy. After milling is completed, the milling media is separated from the milled particulate using conventional separation techniques, such as by filtration, sieving through a mesh screen, and the like. Often the sieve is built into the mill, e.g. for a bead mill.

In general it is desirable to make the color ink in the form of a concentrated mill grind, which is subsequently diluted to the appropriate concentration for use in the inkjet printing system. This technique permits preparation of a greater quantity of pigmented ink from the equipment. By dilution, the ink is adjusted to the desired viscosity, color, hue, saturation density, and print area coverage for the particular application.

The inkjet inks are prepared by mixing the components with the dispersion using regular mixing devices. A method for the stirring and mixing is not particularly restricted and may be appropriately selected according to necessity, using a homogenizer, a paint shaker, an ultrasonic disperser, a stirrer using ordinary stirring blades, a magnetic stirrer, and a high-speed disperser, for example. The ink is finally filtered before use. With drop sizes less than 20 pl in many cases, and printhead nozzles smaller than 30 microns, a filtration step in the range of 1 to 5 μm is implemented. It is vital to ensure no particulates reach the nozzles, as a single failure can lead to the replacement of an entire printhead at significant cost.

For pigmented inks, multiple-stage filtration is typically used after creation of the dispersion, and again after addition of additives and dilution. Here the main objectives are removal of any oversized or agglomerated pigments from the dispersion, as well as any oversized particles and contaminants from other processes.

The available filter technologies have different applications, advantages and disadvantages. Examples of filter are: membrane, depth and hybrid filter types. Common suppliers of filters for inkjet inks are Pall, Porvair, Membrane Solutions.

EXPERIMENTAL

Raw Materials

Pigments used in the different dispersions:
C: PB15:3 from Clariant: PV Fast Blue BG
M1: PR122 from Clariant: Ink Jet Magenta E02
M2: from BASF: Cinquasia Magenta D4550J
M3: PV19/PR202 from Sun Chemical: Quindo Magenta
Y: PY155 from Clariant: Ink Jet Yellow 4GC
Y74: PY74 from Clariant: Ink Jet Yellow 5GX-W
K: PB17 from Orion: Printex 3

Manufacturing Processes

Block Copolymers Synthesis

Block copolymers can be prepared using an array of different, so-called living, polymerization methods. The basis of the method is invariable of the synthetic method used:

An instantaneous initiation, which ensures simultaneously growing of all the polymer chains at a specific propagation speed.

Living polymerization is ensured by adding very small concentrations of active (propagating) chains into the solution at a given time, in order to avoid termination or recombination of radicals.

Continued propagation is strictly controlled, thereby obtaining a small polydispersity of the polymer and thus a well-defined polymer composition.

Further polymerization can be achieved in a number of ways but anionic polymerization and group transfer polymerization (e.g. Atom-Transfer Radical-Polymerization [ATRP], NMP, . . . ) are the two most common synthetic methods. These methods have such specific requirements (no oxygen, no water, . . . ) which make them impractical and expensive when producing large (industrial-sized) volumes of polymers. Two examples thereof are the use of alkyl lithium components at very low temperatures, or naphthanelides to initiate polymerization.

Example

The below procedure describes a potential synthesis method to produce the block dispersing agent, which is characterized as AA-BnA 30-10 having 30 monomers AA for its block length and 10 monomers BnA for its block length. It is a block copolymer dispersant comprised of two blocks, wherein the first block is formed by reacting the monomer acrylic acid (AA) and has a length of about 30 repeating units and the second block is formed by reacting the monomer benzyl acrylate (BnA) and has a length of about 10 repeating units. Other block dispersant architectures can be produced by someone skilled in the art in the same manner by adjusting the amounts and kinds of starting materials and reaction times and the sequence of preparation of the block dispersing agent can be exchanged ie first making the BnA block and afterwards the AA block. "Parts" in the description is based on mass unless noted otherwise.

A 250-milliliter triple neck flask equipped with a thermometer, a backflow condenser, and a nitrogen balloon was charged with 0.43 parts of Cu(I)Br, 38.5 parts of tert-butyl acrylate, 41.2 parts of anisole, an internal standard and 0.69 parts of tris[2-(dimethylamino)ethyl]amine ($Me_6TREN$). The mixture was degassed under vacuum and back-filled with nitrogen three times and heated to 60° C. Subsequently, 1.67 parts of methyl 2-bromopropionate (MBP) were added to initiate the polymerization reaction, which was conducted for 0.5 hours.

In a separate flask, 16.2 parts of benzyl acrylate and 0.87 parts of N,N,N',N",N"-Pentamethyldiethylenetriamine (PM-DETA) were mixed and degassed under vacuum and back-filled with nitrogen three times. This solution was added to the tert-butyl acrylate polymer solution together with 0.72 parts of CuBr and 0.19 parts of Cu(0). The polymerization was stopped after 6 h ($Mn=5406$ and $Mw/Mn=1.37$, Conv.=96.4%) by exposing the catalyst to air. The copper catalyst was removed by column chromatography, after which the excess solvent was removed by evaporation.

Subsequently, the tert-butyl acrylate groups of the block copolymer were hydrolyzed. The purified block copolymer was dissolved in 2 volume parts dioxane under reflux, after which 0.5 equivalents of sulfuric acid, compared to the amount of tert-butyl acrylate repeating units of the polymer, were added to the solution. After 2 hours, an equimolar amount of base was added to stop the reaction. The reaction solution was filtrated over Celite® to remove the formed salts. Dioxane was removed by rotary evaporation, to yield the acrylic acid/benzyl acrylate block copolymer.

For producing a block copolymer with various types of repeating units within one block the procedure remains largely as described above, besides that the corresponding differing monomers for said block are mixed beforehand in a flask (together also with a ligand of choice, such as Pentamethyldiethylenetriamine (PMDETA), and a metal containing compound such as a Cu containing compound), degassed under vacuum and back-filled with nitrogen three times. As known by someone skilled in the art it might be required to modify the amount/type of ligand and metal depending on monomer selection. This will ensure a low degree of polydispersity of the block and a high conversion rate. Preferably, the various types of repeating units are substantially randomly distributed within the block based on the process conditions for obtaining said block.

The current synthesis method describes the "common" reactor-based synthesis. Alternatively, a Flow chemistry process can be employed to synthesize the mentioned block dispersing agents. The inventors refer to "Flow Chemistry: Integrated Approaches for Practical Applications", Santiago V Luis, Eduardo Garcia-Verdugo (Ed.), 2019, (ISBN: 978-1-78801-498-4/978-1-78801-609-4). The block dispersant was synthesized using a flow reactor using the same starting materials as the "common reactor" except EBiB was used as an initiator, 365 nm UV LED light as a source of photons, the reaction was initiated by reduction of $Cu(II)Br_2$ to $Cu(0)$ and the solvents used were acetonitrile:ethanol 1:1. The flow reactor was assembled with PFA tubing (1/16" OD, 0.75 mm ID). The streams were respectively connected via inline check valves, T-piece and a static mixer before entering the photoreactor to ensure homogeneity. 16 LEDs (365 nm) were assembled on the octagonal reactor (in house built using 3D printer, with a PLA filament). The second polymer block can be added to the first block in a subsequent reactor module. Finally, hydrolysation and filtration steps can be performed similar to the batch process described above or integrated in the flow reactor setup.

In order to make the dispersant compatible with the carrier, the hydrophilic monomer needs to be neutralized thereby ionizing the salt-forming group of the block polymer. As the neutralizing agent, there can be used an acid or a base depending upon the kinds of the salt-forming group, e.g. basic such as DMAEMA or acidic such as (meth)acrylic acid. The neutralizing agent for basic monomers includes, for instance, inorganic acids such as hydrochloric acid and sulfuric acid; and organic acids such as acetic acid, propionic acid, lactic acid, succinic acid and glycolic acid. In addition, the neutralizing agent for acidic monomers includes, for instance, tertiary amines such as trimethylamine and triethylamine, triethanolamine, ammonia, 2-dimethylamino ethanol, 2 anmino-2 methyl 1 propanol, 2 (2amino-ethylamino) ethanol, 2 amino-2methyl 1 propanol, sodium hydroxide, potassium hydroxide, and the like. The present invention is not limited to those exemplified ones.

Note that the total dispersant weight mentioned in the examples below includes the mass of the neutralizing agent.

Encapsulation

Crosslinking is performed right after the milling process by chemically coupling the dispersing agents together on the surface. A very popular method to achieve this sees an epoxy compound (mostly di- or tri-epoxides) added to the dispersion in order to couple a certain portion of the (meth)acrylic acid monomers present in the dispersing agent backbone (preferably on the surface of the pigment particle). If not all dispersant is adhered to the pigment surface then these free polymers will disturb the crosslinking process e.g. by being built in between polymer particles and thus flocculating part of the dispersion and therefore have to be removed afterwards. These resulting encapsulated pigment particles will possess great stability because of the formation of a "net" or "capsule" of dispersing agent across the surface of the particle, which cannot be disturbed by the addition of co-solvents and surfactants.

Pigment Dispersion Production

A pigment dispersion having a composition according to Table 1 is prepared by milling 30 gr of raw materials in a ball jar with a pigment concentration of 15%.

The ball jar milling is performed in PP bottles of 125 ml with a diameter of 45 mm. The bottles are filled with 200 gr of 0.3 mm YTZ ceramic beads from Tosoh. The milling is done at a rotational speed of 36 m/min for 7 days.

TABLE 1

Pigment dispersion composition

| component | weight |
| --- | --- |
| Pigment (according table 2) | 4.5 gr |
| Block dispersant (according table 2), neutralized with sodium hydroxide | 4.5 gr |
| water | 21 gr |
| Total | 30 gr |

Analytical Methods

Dispersion Stability Using Spectral Separation Factor

The spectral separation factor (SSF) of dispersion ink is calculated as the ratio of the maximum absorbance Amax over the absorbance Aref at the reference wavelength. The choice of this reference wavelength is dependent on the pigment(s) used: if the color dispersion has a maximum absorbance Amax between 400 and 500 nm (typically for yellow pigments) then the absorbance Aref must be determined at a reference wavelength of 600 nm, If the color ink has a maximum absorbance Amax between 500 and 600 nm (typically for magenta pigments) then the absorbance Aref must be determined at a reference wavelength of 650 nm, If the color ink has a maximum absorbance Amax between 600 and 700 nm (typically for cyan pigments) then the absorbance Aref must be determined at a reference wavelength of 830 nm.

The absorbance spectra are measured by a UV vis Spectrophotometer Genesys 180 available from Thermoscientifica.

$$SSF = \frac{A_{max}}{A_{ref}}$$

Particle Size Analysis

The particle size of pigments is determined on a Nicomp 3.80 particle sizer (Particle sizing systems, Santa Barbara California USA). The dispersion is diluted to 10 to 100 ppm to reach optimal measurement performance (i.e. the dispersion is diluted $10*10^6$ times to $100*10^6$ times). The diluted samples are measured at 23 C with a HeNe laser and the dv50 is obtained from the Gaussian analysis of the scattered light intensity profile.

Surface Tension

The surface tension is a value measured at a temperature between 23.0° C. and 26.0° C. by the air bubble pressure method using a surface tensiometer SITA Pro Line T15 (SITA Messtechnik Co, Dresden GE.). The bubble lifetime used is 10 seconds and this is the time between the generation of a new air-liquid interface (at the tip of a capillary immersed into the ink liquid) until the maximum bubble pressure is reached. The maximum pressure measured is automatically recalculated into a surface tension value of the liquid (in mN/m) after calibration of the device in distilled water.

Viscosity

The viscosity of (dispersion and supernatant liquid) is measured with a Haake Rheostress RS6000 operated in shear rate sweep from 0.1 to 3000 l/s at 25° C. and expressed in mPa·s. The instrument is equipped with a cone/plate geometry type C60/1° and the gap is set to 0.052 mm. The reported viscosity is measured at a frequency of 3000 l/s.

Assessment Methodology

Stability of Dispersions

The dispersion stability of the pigment dispersion was tested in very harsh conditions. The dispersions were stored at elevated temperature of 80° C. for 7 days after having added diethyleneglycolmonobytulether (DEGMBE) as an organic solvent for disturbing the pigment dispersion stability.

A closed glass vial with 5 g of dispersion, 1.5 g of DEGMBE and 8.5 gr of water was used. The pigment dispersion has 15 wt-% pigment relative to the total weight of the pigment dispersion. The amount of pigment in the test is 15 wt-%×5 [g]/15 [g]=5 wt-% relative to the total weight of the composition. The amount of DEGMBE is 1.5/15=10 wt-% relative to the total weight of the composition. Particle size and spectral separation factor SSF are measured before and after the heat treatment. The stability is considered good when spectral separation factor SSF>30 and particle size <=150 nm, measured according the analytical method described above, for the samples to which DEGMBE was added.

For black and PY74 based dispersions only particle size analysis was used (not possible to measure SSF of black due to panchromatic behavior and PY74 has some instability at 80° C.)

Grinding Performance of Dispersing Agents

Grinding performance of dispersing agents is determined by the particle size and spectral separation factor SSF that can be obtained after grinding. Good grinding performance is reached when spectral separation factor SSF>30 and particle size <=150 nm. When the grinding performance is not within specification no stability test was performed.

Results

Table 2A-2D: grinding results prepared using different block co-polymeric dispersants and stability results of the pigment dispersions (to which the DEGMBE/water mixture having weight ratio 1:9 was added) when in contact with DEGMBE for 1 week at 80° C.

TABLE 2A grinding and stability results of pigment dispersions (to which the DEGMBE/water mixture was added) for 1 week at 80° C. using different block co-polymeric dispersants

| # AA | # EHA | C grinding | C stability | C overall | M1 grinding | M1 stability | M1 overall | Y grinding | Y stability | Y overall | K grinding | K stability | K overall |
|---|---|---|---|---|---|---|---|---|---|---|---|---|---|
| 10 | 3 | V | X | X | V | X | X | V | X | X | V | X | X |
| 10 | 5 | V | X | X | V | X | X | X |   |   | V | X | X |
| 10 | 7 | V | X | X | V | X | X | X |   |   | V | X | X |
| 10 | 10 | V | X | X | V | X | X | X |   |   | X |   |   |
| 10 | 15 | V | V | V | X |   |   | V | X | X | V | X | X |
| 10 | 20 | V | V | V | X |   |   | V | X | X | X |   |   |
| 15 | 3 | V | X | X | X |   |   | X |   |   | V | X | X |
| 15 | 5 | V | X | X | V | X | X | X |   |   | V | X | X |
| 15 | 7 | V | X | X | V | X | X | X |   |   | V | X | X |
| 15 | 10 | V | V | V | X |   |   | V | X | X | V | X | X |
| 15 | 15 | V | V | V | X |   |   | X |   |   | X |   |   |
| 15 | 20 | V | V | V | X |   |   | V | X | X | V | X | X |
| 20 | 5 | V | X | X | V | X | X | X |   |   | V | X | X |
| 20 | 7 | V | X | X | V | X | X | X |   |   | V | X | X |
| 20 | 10 | V | X | X | V | X | X | X |   |   | V | X | X |
| 20 | 15 | V | V | V | X |   |   | V | X | X | V | X | X |
| 20 | 20 | V | V | V | X |   |   | X |   |   | V | X | X |
| 25 | 30 | X |   |   | V | V | V | X |   |   | V | X | X |
| 30 | 40 | X |   |   | X |   |   | X |   |   | V | V | V |
| 40 | 50 | X |   |   | X |   |   | X |   |   | V | X | X |

AA: acrylic acid monomer (monomer 1)
EHA: ethylhexyl acrylate monomer (monomer 2)

In the table the number # specifies the number of monomers (monomer 1, monomer 2) of the respective block of the diblock copolymer dispersant.

Pigments used in the different dispersions:
C: PB15:3 from Clariant: PV Fast Blue BG
M1: PR122 from Clariant: Ink Jet Magenta E02
Y: PY155 from Clariant: Ink Jet Yellow 4GC
K: PB17 from Orion: Printex 3
V: Ok
X: not Ok A pigment dispersion was considered OK (V) when the dv50 is max. 150 nm and SSF>30. For black pigment (K) it was not possible to determine SSF only PSD is used as criteria.

Also for PY74 only PSD is used because the pigment is not stable at 80° C.

It has been found that dispersants having a mixed block BnA/EOEOEA may show improved usability in various ink jet ink compositions compared to dispersants mentioned in table 2A, 2B and 2C. It is believed that the randomly distributed EOEOEA repeating units within its block sup-

TABLE 2B grinding results prepared using different block copolymeric dispersants and stability results of the pigment dispersions (to which the DEGMBE/water mixture was added) for 1 week at 80° C.

| # | # | C | | | M 1 | | | Y | | | K | | |
|---|---|---|---|---|---|---|---|---|---|---|---|---|---|
| AA | BnA | grinding | stability | overall | grinding | stability | overall | grinding | stability | overall | grinding | stability | overall |
| 15 | 10 | V | V | V | V | X | X | V | X | X | V | X | X |
| 15 | 30 | V | V | V | X | | X | V | V | V | V | X | X |

AA: acrylic acid monomer (monomer 1)
BnA: benzyl acrylate monomer (monomer 2)
In the table the number # specifies the number of monomers (monomer 1, monomer 2) of the respective block of the diblock copolymer dispersant.
C: PB15:3 from Clariant: PV Fast Blue BG
M1: PR122 from Clariant: Ink Jet Magenta E02
Y: PY155 from Clariant: Ink Jet Yellow 4GC
K: PBl7 from Orion: Printex 3
V: Ok
X: not Ok

TABLE 2C grinding results prepared using different block copolymeric dispersants and stability results of the pigment dispersions (to which the DEGMBE/water mixture was added) for 1 week at 80° C.

| | | M 2 | | | M 3 | | | Y74 | | |
|---|---|---|---|---|---|---|---|---|---|---|
| AA | BnA | grinding | stability | overall | grinding | stability | overall | grinding | stability | overall |
| 15 | 10 | V | V | V | V | X | X | V | X | X |
| 15 | 30 | V | V | V | X | | X | V | V | V |

AA: acrylic acid monomer (monomer 1)
BnA: benzyl acrylate monomer (monomer 2)
In the table the number # specifies the number of monomers (monomer 1, monomer 2) of the respective block of the diblock copolymer dispersant.
M2: from Basf: Cinquasia Magenta D4550J
M3: PV19/PR202 from Sun Chemical: Quindo Magenta
Y74: PY74 from Clariant: Inkjet Yellow 5GX-W
V: Ok
X: not Ok

TABLE 2D grinding results prepared using block copolymeric dispersant and stability results of the pigment dispersion (to which the DEGMBE/water mixture was added) for 1 week at 80° C.

| | BnA/ | M 2 | | | C | | | Y74 | | | K | | |
|---|---|---|---|---|---|---|---|---|---|---|---|---|---|
| AA | EOEOEA | grinding | stability | overall | grinding | stability | overall | grinding | stability | overall | grinding | stability | overall |
| 15 | 30/10 | V | V | V | X | X | X | X | X | X | V | X | X |
| 25 | 30/10 | X | X | X | V | X | X | V | X | X | V | V | V |
| 25 | 20/20 | X | X | X | V | V | V | V | V | V | X | X | X |

AA: acrylic acid monomer (monomer 1)
BnA: benzyl acrylate monomer (monomer 2a)
EOEOEA: 2-(2ethoxyethoxy)ethyl acrylate (monomer 2b)
In the table the number # specifies the number of monomers (monomer 1, monomer 2a, monomer 2b) of the respective block of the diblock copolymer dispersant.
BnA/EOEOEA: 30/10 is defined as the block contains 30 units of BnA en 10 units of EOEOEA, wherein the repeating units are randomly distributed within the block.
BnA/EOEOEA: 20/20 is defined as the block contains 20 units of BnA en 20 units of EOEOEA, wherein the repeating units are randomly distributed within the block.
M2: from Basf: Cinquasia Magenta D4550J
C: PB15:3 from Clariant: PV Fast Blue BG
V: Ok
X: not Ok ports a better solubility of the dispersant in the aqueous carrier of the ink composition.

From the examples in table 2A-2D it can be concluded that extremely stable pigment dispersions can be obtained for the following ink set combinations:

For the combination of pigments C, M2, Y, K by using 2 dispersants:
first dispersant AA-BnA 15-30 having 15 monomers AA for its block length and 30 monomers BnA for its block length. The dispersant is used for C, M2 and Y;
and second dispersant AA-EHA 30-40 having 30 monomers AA for its block length and 40 monomers EHA for its block length. The dispersant is used for K.

For the combination of pigments C, M1, Y, K by using 3 dispersants:
first dispersant AA-BnA 15-30 having 15 monomers AA for its block length and 30 monomers BnA for its block length. The dispersant is used for C and Y;
second dispersant AA-EHA 30-40 having 30 monomers AA for its block length and 40 monomers EHA for its block length. The dispersant is used for K;
and third dispersant AA-EHA 25-30 having 25 monomers AA for its block length and 30 monomers EHA for its block length. The dispersant is used for M1.

For the combination of pigments C, M1, Y74, K by using 3 dispersants:
first dispersant AA-BnA 15-30 having 15 monomers AA for its block length and 30 monomers BnA for its block length. The dispersant is used for C and Y74;
second dispersant AA-EHA 30-40 having 30 monomers AA for its block length and 40 monomers EHA for its block length. The dispersant is used for K;
and third dispersant AA-EHA 25-30 having 25 monomers AA for its block length and 30 monomers EHA for its block length. The dispersant is used for M1.

For the combination of pigments C, M2, Y74, K by using 3 dispersants:
first dispersant BnA/EOEOEA-AA 20/20-25 having 40 monomers for its block length, with 20 units of BnA and 20 units of EOEOA randomly distributed in said block, and 25 monomers AA for its block length. The dispersant is used for C and Y74;
second dispersant BnA/EOEOEA-AA 30/10-25 having 40 monomers for its block length, with 30 units of BnA and 10 units of EOEOA randomly distributed in said block, and 25 monomers AA for its block length. The dispersant is used for K;
and third dispersant BnA/EOEOEA-AA 30/10-15 having 40 monomers for its block length, with 30 units of BnA and 10 units of EOEOA randomly distributed in said block, and 15 monomers AA for its block length. The dispersant is used for M2.

At least two different block polymeric dispersants are needed to create a very stable dispersion set allowing to create a stable inkjet ink set for forming a full color image on a substrate.

The above mentioned combinations are merely exemplary.

Inkjet inks are prepared by diluting the pigment dispersion according to Table 3

TABLE 3

| | inkjet ink composition for ink set (CMYK) | | | | |
|---|---|---|---|---|---|
| Ink ingredient | weight-% cyan | magenta | yellow Y74 | yellow PY155 | black |
| inventive pigment dispersion | 20 | 35 | 20 | 30 | 30 |
| glycerol | 22 | 20 | 22 | 20 | 20 |
| 1-2 propanediol | 11 | 10 | 11 | 10 | 10 |
| diethyleneglycolmonobuthylether | 5 | 5 | 5 | 5 | 5 |
| silicone surfactant Byk 347 | 0.4 | 0.4 | 0.4 | 0.4 | 0.4 |
| water | rest | rest | rest | rest | rest |

All these inks demonstrate a high dispersion stability.

The cyan ink contains the cyan pigment dispersion containing the cyan pigment PV Fast Blue BG from Clariant and the block copolymer dispersant AA-BnA 15-20.

The magenta ink contains the magenta pigment dispersion containing the magenta pigment M1 Ink Jet Magenta E02 and the block copolymer dispersant AA-EHA 25-30.

The yellow Y47 ink contains the yellow pigment dispersion containing the pigment and the block copolymer dispersant AA-BnA 15-30.

The yellow PY155 ink contains the yellow pigment dispersion containing the pigment Ink Jet Yellow 4GC and the block copolymer dispersant AA-BnA 15-20.

The black ink contains the black pigment dispersion containing the pigment PB17 from Orion and the block copolymer dispersant AA-EHA 30-40.

The viscosity of the final inkjet inks is typically between 4 and 10 mPa·s at 25° C. and the static surface tension between 17 and 35 mN/m.

The invention claimed is:

1. An ink set of inkjet inks for forming an image on a substrate, the inkjet inks comprising at least a first ink and a second ink, each said first and second ink comprising:
   a. a pigment;
   b. a block copolymer dispersant for dispersing the pigment, wherein the block copolymer dispersant comprises a first block and a second block; wherein the second block is formed using at least one monomer M2, which monomer M2 is selected from the group consisting of a methacrylate and an acrylate, wherein the monomer M2 is an anchoring monomer for anchoring to the pigment; and
   c. at least one water soluble organic solvent; and
   d. water;
   wherein said pigment P1 of said first ink is different from said pigment P2 of said second ink; and wherein said block copolymer dispersant D1 of said first ink is different from said block copolymer dispersant D2 of said second ink, wherein the second block of the first block copolymer dispersant D1 comprises a repeating unit formed using an aryl (meth)acrylate monomer, and the second block of the second block copolymer dispersant D2 comprises a repeating unit formed using an alkyl (meth)acrylate monomer;

wherein the inkjet ink set comprises a cyan ink comprising a cyan pigment, a magenta ink comprising a magenta pigment, a yellow ink comprising a yellow pigment and a black ink comprising a black pigment;

wherein the magenta pigment is a quinacridone pigment selected from Pigment Red 122, Pigment Violet 19, and Pigment Red 202 or the magenta pigment is Pigment Red 57:1, preferably selected from Pigment Violet 19 and Pigment Red 202, and/or wherein the cyan pigment is Pigment Blue 15:3, and/or wherein the yellow pigment is selected from Pigment Yellow 155 and Pigment Yellow 74, and/or wherein the black pigment is a carbon black, preferably Pigment Black 7.

2. The ink set according to claim 1, wherein for each of the block copolymer dispersants D1, D2 the first block is a hydrophilic stabilization part for aqueous phase stabilization of the pigment and the second block is an anchoring part for anchoring to the pigment.

3. The ink set according to claim 2, wherein for at least one of the block copolymer dispersants D1, D2 the first block is formed using at least one monomer M1, preferably being a hydrophilic monomer for aqueous phase stabilization of the pigment, which is selected from the group consisting of methacrylic acid, acrylic acid, maleic acid, maleic acid monoester, itaconic acid, itaconic acid monoester, crotonic acid, crotonic acid monoester, N,N-dimethylaminoethyl methacrylate, N,N-diethylaminoethyl methacrylate, N,N-dimethylaminoethyl acrylate, N,N-diethylaminoethyl acrylate, t-butylaminoethyl methacrylate, t-butylaminoethyl acrylate and mixtures thereof.

4. The ink set according to claim 2, wherein for each of the block copolymer dispersants D1, D2 the first block is a hydrophilic stabilization part for aqueous phase stabilization of the pigment, and wherein the first block of the block copolymer dispersant D1 of the first ink is different from the first block of the block copolymer dispersant D2 of the second ink in at least one of:
n1, which is the number of repeating units of the first block of the block copolymer dispersant D1, is different from n2, the number of repeating units of the first block of the block copolymer dispersant D2;
at least one repeating unit of the first block of the block copolymer dispersant D1 is different from the repeating units of the first block of the block copolymer dispersant D2; and
wherein the first block has at least two, differing, repeating units, and wherein a number ratio between respective repeating units of the block copolymer dispersant D1 is different from a number ratio between respective repeating units of the block copolymer dispersant D2.

5. The ink set according to claim 1, wherein for each of the block copolymer dispersants D1, D2 the second block is an anchoring part for anchoring to the pigment, and wherein the second block of the block copolymer dispersant D1 of the first ink is different from the second block of the block copolymer dispersant D2 of the second ink in at least one of:
a. m1, which is the number of repeating units of the second block of the block copolymer dispersant D1, is different from m2, the number of repeating units of the second block of the block copolymer dispersant D2;
b. at least one repeating unit of the second block of the block copolymer dispersant D1 is different from the repeating units of the second block of the block copolymer dispersant D2; and
c. wherein the second block has at least two, differing, repeating units, and wherein a number ratio between respective repeating units of the block copolymer dispersant D1 is different from a number ratio between respective repeating units of the block copolymer dispersant D2.

6. The ink set according to claim 1, wherein for each of the block copolymer dispersants D1, D2 the monomer M2 is at least one of benzyl methacrylate, butyl methacrylate, methyl methacrylate, ethyl methacrylate, propyl methacrylate, hexyl methacrylate, 2-ethylhexyl methacrylate, octyl methacrylate, lauryl methacrylate, stearyl methacrylate, phenoxyethyl methacrylate, methacrylonitrile, glycidyl methacrylate, p-tolyl methacrylate, sorbyl methacrylate, ethylene glycol methyl ether methacrylate, 2-ethoxyethyl methacrylate, di(ethylene glycol) methyl ether methacrylate, tri(ethylene glycol) methyl ether methacrylate, hydroxyethyl methacrylate, hydroxypropyl methacrylate,
benzyl acrylate, butyl acrylate, methyl acrylate, ethyl acrylate, propyl acrylate, hexyl acrylate, 2-ethylhexyl acrylate, octyl acrylate, lauryl acrylate, stearyl acrylate, phenoxyethyl acrylate, glycidyl acrylate, p-tolyl acrylate, sorbyl acrylate, ethylene glycol methyl ether acrylate, 2-ethoxyethyl acrylate, di(ethylene glycol) methyl ether acrylate, tri(ethylene glycol) methyl ether acrylate, hydroxyethyl acrylate, hydroxypropyl acrylate, dimethylaminoethyl acrylate (DMAA), N,N-dimethylacrylamide, acryloyl morpholine (ACMO), and 2-(2ethoxyethoxy)ethyl acrylate (EOEOEA) and mixtures thereof.

7. The ink set according to claim 1, wherein the aryl (meth)acrylate monomer contains a benzyl group and/or wherein the alkyl (meth)acrylate monomer contains a branched alkyl group, preferably being ethylhexyl (meth)acrylate monomer.

8. The ink set according to claim 1, wherein a number of repeating units of the first block is defined as n and wherein a number of repeating units of the second block is defined as m.

9. The ink set according to claim 1, wherein the second block copolymer dispersant D2 has a number of repeating units m in the range 10-100, preferably wherein a ratio n/m of the second block copolymer dispersant D2 is <3.0, and in particular >0.2, wherein more preferably the number of repeating units n of the second block copolymer dispersant D2 is in the range 5-50.

10. The ink set according to claim 1, wherein for each of the block copolymer dispersants D1, D2 the first block comprises a repeating unit formed using a monomer, which is selected from methacrylic acid and acrylic acid.

11. The ink set according to claim 1, wherein for each of the block copolymer dispersants D1, D2 the block copolymer dispersant is a diblock copolymer.

12. The ink set according to claim 1, wherein the amount of the pigment is at least 1.0 wt-%, preferably at least 2.0 wt-%, relative to the total weight of the ink, wherein preferably each ink has a viscosity of at most 30 mPa·s at 25° C.

13. The ink set according to claim 1, wherein the weight-concentration of the at least one water soluble organic solvent, in the ink is in the range of 5 wt-%-50 wt-%, preferably in the range of 7.5 wt-%-35 wt-%, based on the total weight of the ink, wherein preferably the glycol ether compound is a glycol monobutyl ether.

14. An inkjet printing process for forming an image on a substrate by applying a plurality of inkjet inks of an ink set on the substrate, wherein the ink set is according to claim 1.

15. The inkjet printing process according to claim 14, comprising jetting droplets of each inkjet ink on the substrate to form a color image on the substrate, wherein preferably the droplets are jetted by using an inkjet print head.

16. The inkjet printing process according to claim 14, comprising forming the image on a corrugated board, a corrugated liner, a label substrate, or a flexible packaging substrate.

17. An ink set of inkjet inks for forming an image on a substrate, the inkjet inks comprising at least a first ink and a second ink, each said first and second ink comprising:
   a. a pigment;
   b. a block copolymer dispersant for dispersing the pigment, wherein the block copolymer dispersant comprises a first block and a second block; wherein the second block is formed using at least one monomer M2, which monomer M2 is selected from the group consisting of a methacrylate and an acrylate, wherein the monomer M2 is an anchoring monomer for anchoring to the pigment; and
   c. at least one water soluble organic solvent; and
   d. water;
   wherein said pigment P1 of said first ink is different from said pigment P2 of said second ink; and wherein said block copolymer dispersant D1 of said first ink is different from said block copolymer dispersant D2 of said second ink, wherein the second block of the first block copolymer dispersant D1 comprises a repeating unit formed using an aryl (meth)acrylate monomer, and the second block of the second block copolymer dispersant D2 comprises a repeating unit formed using an alkyl (meth)acrylate monomer; and
   wherein the block copolymer dispersant is at least partially crosslinked, wherein the block copolymer dispersant is attached to or at least partially encapsulates the pigment.

18. An ink set of inkjet inks for forming an image on a substrate, the inkjet inks comprising at least a first ink and a second ink, each said first and second ink comprising:
   a. a pigment;
   b. a block copolymer dispersant for dispersing the pigment, wherein the block copolymer dispersant comprises a first block and a second block; wherein the second block is formed using at least one monomer M2, which monomer M2 is selected from the group consisting of a methacrylate and an acrylate, wherein the monomer M2 is an anchoring monomer for anchoring to the pigment; and
   c. at least one water soluble organic solvent; and
   d. water;
   wherein said pigment P1 of said first ink is different from said pigment P2 of said second ink; and wherein said block copolymer dispersant D1 of said first ink is different from said block copolymer dispersant D2 of said second ink, wherein the second block of the first block copolymer dispersant D1 comprises a repeating unit formed using an aryl (meth)acrylate monomer, and the second block of the second block copolymer dispersant D2 comprises a repeating unit formed using an alkyl (meth)acrylate monomer;
   wherein the at least one water soluble organic solvent comprises at least one of a polyol compound and a glycol ether compound and/or
   wherein the weight-concentration of the at least one water soluble organic solvent, in the ink is in the range of 5 wt-%-50 wt-%, preferably in the range of 7.5 wt-%-35 wt-%, based on the total weight of the ink, wherein preferably the glycol ether compound is a glycol monobutyl ether.

\* \* \* \* \*